Feb. 23, 1965
R. H. BALDWIN
3,170,768
SYSTEM FOR CONTINUOUS PREPARATION OF TEREPHTHALIC ACID
Original Filed April 22, 1959
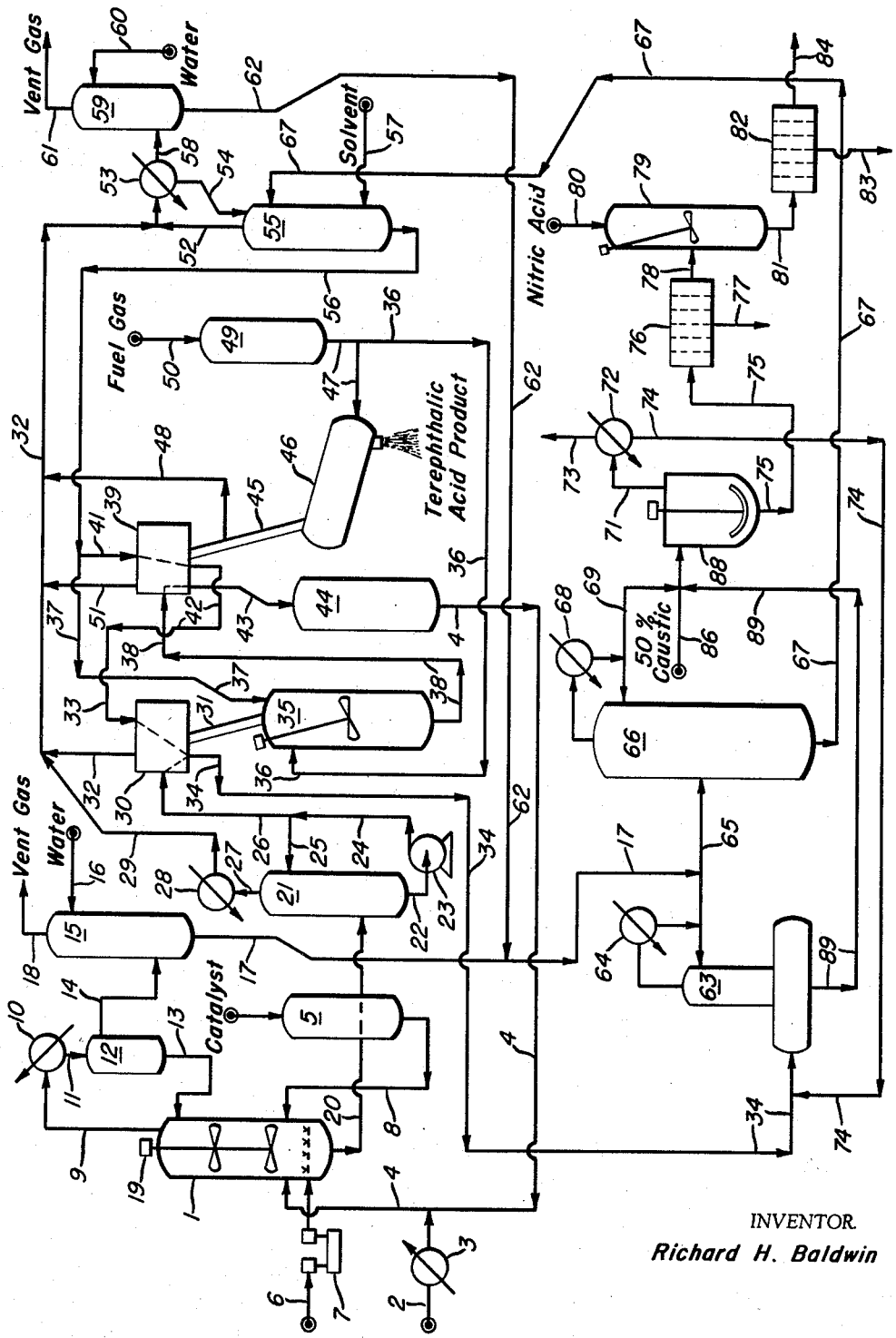
INVENTOR.
Richard H. Baldwin

3,170,768
SYSTEM FOR CONTINUOUS PREPARATION OF TEREPHTHALIC ACID

Richard H. Baldwin, Chicago, Ill., assignor to Standard Oil Company, Chicago, Ill., a corporation of Indiana
Original application Apr. 22, 1959, Ser. No. 808,150. Divided and this application Nov. 24, 1961, Ser. No. 156,190
3 Claims. (Cl. 23—263)

This invention relates to the commercial preparation of terephthalic acid, and more particularly is concerned with the provision of an integrated process for the oxidation of paraxylene to prepare high purity terephthalic acid.

The primary object of the present invention is to provide a system for oxidizing paraxylene to terephthalic acid using molecular oxygen as the oxidizing agent and conducting a reaction in the liquid phase; in the inventive system means are provided for initially purifying and recovering the terephthalic acid product using simplified purification techniques. An additional object is to provide, in the above system, integrated facilities for recovering and recycling the lower monocarboxylic acid used as a liquid oxidation reaction medium and, optionally, to recover and recycle the oxidation catalyst. A further object is to provide an integrated system for conducting the oxidation and product recovery operations in a manner which obviates the elaborate and expensive equipment hitherto required for prior art processes. Other and more particular objects will become apparent as the detailed description proceeds.

In practicing the present invention, a substantially pure paraxylene, i.e., a paraxylene of at least about 95% and preferably about 98% or higher purity is oxidized with air in the liquid phase. The reaction is conducted in a zone maintained at a temperature in the range of about 325 to 475° F. and preferably 350 to 450° F. and a pressure effective to maintain a liquid phase in the reaction zone, the desirable pressure being in the range of 50 to 500 p.s.i. and preferably 200 to 350 p.s.i., for an average contacting period of about .2 to 2 hours or more. Also present in the reacton zone as a liquid reaction medium is a saturated monocarboxylic acid having from 2 to 8 carbon atoms in the molecule, illustratively acetic acid, which functions as solvent for catalyst and feedstock. After completion of the oxidation reaction, crude crystals of terephthalic acid are physically separated from the reaction mixture; the crude crystals are purified by washing them with dehydrated saturated monocarboxylic acid, obtained as hereinafter described. Where higher purity terephthalic acid is required the crude crystals may be reslurried with at least a major portion of the dehydrated monocarboxylic acid, from which slurry the terephthalic acid crystals may be physically separated by suitable means such as centrifugation. Desirably, these latter crystals may be re-washed with a minor portion of dehydrated monocarboxylic acid. The wash liquor from this operation is employed to pre-wash the crude terephthalic acid crystals initially separated from the reaction mixture before reslurrying or washing the crystals with the major portion of dehydrated monocarboxylic acid. The dehydrated monocarboxylic acid employed as wash liquor according to any of the foregoing variations is obtained by distillation of the liquid portion of the reaction mixture, by means of which water and a distillation bottoms or residue fraction are excluded. This bottoms fraction contains oxidation catalyst as well as oxidation intermediates and by-products; the invention also contemplates recovering oxidation catalyst from the bottoms fraction by selectively extracting acidic intermediates and byproducts from the bottoms fraction with an aqueous solution of a monovalent alkali hydroxide, for example caustic, ammonia, potassium hydroxide, etc. The catalyst, which remains as an insoluble material and which is free from the intermediates and byproducts, may be recycled to the oxidation reaction zone.

The invention will be more clearly understood from the following detailed description of a specific commercial example read in conjunction with the accompanying drawing which is a schematic flowsheet of the improved process. The process is designed to produce commercially pure terephthalic acid. Process utilities and auxiliaries such as pumps, valves, gages, etc. have been omitted from the drawing and specification for simplicity, and those skilled in the art will readily perceive the nature and location of these items in the plant.

Oxidation is effected either batchwise or continuously in reactor 1, which is constructed of corrosion resistant metals and is provided with rotary mixer 19. The paraxylene feed, preheated to 300–350° F. in preheater 3, enters the system through line 2 at a rate of 1000 pounds per hour. The saturated monocarboxylic acid is employed in a proportion of from about 1:1 to about 5:1 weight per weight of paraxylene; in this example it is introduced at a rate of 2000 pounds per hour expressed as 95% acid, the balance being water, and enters through line 4 via an optional preheater, not shown. Catalyst, in the form of a slurry or solution in acetic acid, is stored in tank 5 and fed into reactor 1 through line 8. The oxidizagent, air in this case, is introduced through line 6 by compressor 7 at a rate sufficient to complete the oxidation reaction in about one hour.

The present invention is an improvement on the fundamental heavy metal-bromine catalyst system recently developed by others, and no novelty is claimed per se in the catalyst or in the catalyst promoter. However, the catalyst system is an essential feature of the present invention as it largely eliminates the substantial quantities of tars and incompletely-oxidized paraxylene characteristic of prior-art catalyst systems, and hence greatly reduces the equipment requirements in the plant. The catalyst is one or more of the heavy metals, which include the lanthanide and actinide rare earths, preferably in a form which is soluble in the reaction mixture. The catalyst metal may advantageously be selected from the group manganese, cobalt, nickel, chromium, vanadium, molybdenum, tungsten, tin and cerium, and the metal may be employed as an element, in ionic form, or as a constituent of an organic compound; it is preferably in the form of a metal acetate or acetate hydrate. The promoter is a substance capable of affording bromine, the promoter being elemental bromine or an organic or inorganic bromine-containing compound. Thus the bromine may be added in the form, illustratively, of potassium bromate, ammonium bromide, benzyl bromide, tetrabromoethane, manganese bromide, or the like. The proportions of catalyst and promoter may be preferably stoichiometric as exemplified by manganese bromide, $MnBr_2$, and generally are in the range of 1:10 to 10:1 atoms of catalyst metal per atom of bromine. The amount of catalyst employed is usually in the range of about 0.01 to 10% or more of paraxylene, and is preferably in the range of about 0.2 to 2% by weight, all figures being expressed on the basis of elemental metal to elemental bromine. In certain instances a mixture of two or more catalysts is desirably employed, the preferred mixed metal catalysts being mixtures of manganese in the form of its bromide, hydroxide, or acetate with cobalt bromide, cobalt versene, cobalt acetate, or the like. In the system described herein a mixed manganese and cobalt hydroxide catalyst is suspended in acetic acid in tank 5 and introduced to reactor 1 through line 8, with makeup catalyst being added as required. The bromine-affording substance is tetrabromoethane.

During the oxidation, the reaction between paraxylene and molecular oxygen which occurs in reactor 1 evolves considerable heat of reaction which manifests itself in boiling off acetic acid, water and some paraxylene. These vapors together with non-condensible gases pass through line 9 and enter reactor overhead condenser 10 and via line 11 into entrainment separator 12. There the condensed acetic acid, water and paraxylene separate as one or more liquid phases which are returned to reactor 1 through leg 13 where they serve to control the temperature in reactor 1. Since however condenser 10 is generally not effective to condense all of the valuable acetic acid and paraxylene vapors, vapor line 14 off entrainment separator 12 passes through reactor vent gas scrubber 15 which may be a tower packed with Berl saddles where the gas is scrubbed with 200 pounds per hour of water introduced into scrubber 15 through line 16. The vent gas leaves at line 18, and the rich liquor comprising dilute aqueous acetic acid is withdrawn through line 17 and conducted to solvent dehydration column 16, to be described presently.

The reaction mixture at the conclusion of the oxidation is obtained from reactor 1 through line 20 and sent to effluent surge tank 21. This mixture is in the form of a thick slurry of terephthalic acid crystals, and is kept in suspension by recirculating via recycle line 22, pump 23, and lines 24 and 25. Vapors from effluent surge tank 21 pass through line 27, through overhead condenser 28 which condenses and returns acetic acid and water vapors back to tank 21, and through line 29 to low pressure vent gas absorber 59 for acetic acid removal by water scrubbing. In absorber 59, 100 pounds per hour of water introduced through line 60 scrubs acetic acid vapors from the gas, and the outlet gas is vented through line 61 while the rich liquor passes via line 62 to solvent dehydration column 66.

From surge tank 21, the main reactor effluent stream is pumped while hot through line 26 to first stage centrifuge 30 which separates crude wet terephthalic acid crystals from the reaction mixture. Because of the low solubility of terephthalic acid in the reaction mixture, centrifugation of the hot liquor is effective in recovering substantially all of the acid while retaining such impurities as catalyst and isophthalic and o-phthalic acid in the centrifugate. The mother liquor is sent through line 34 to the solvent flash distillation column 63 to begin acetic acid and catalyst recovery. The centrifuged crystals are washed while in centrifuge 30 with from about 0.1 to 1.0 pound of about 95% acetic acid per pound of crystals, which acetic acid is withdrawn as the effluent wash liquor from second stage centrifuge 39, and this stream is ultimately conducted through line 34 to solvent flash distillation column 63. It will be observed that this first stage wash serves to remove gross amounts of adhering liquid reaction mixture from the crude terephthalic acid crystals. The washed crystals are passed through line 31 to solids reslurrying drum 35 which is equipped with an agitator as shown and with vertical plate baffles. Here from about 1.0 to about 5.0 pounds of about 95% acetic acid per pound of crystals, which is obtained from solvent dehydration column 66 via recycle solvent surge drum 55 and lines 56 and 57, is added. Meanwhile, a stream of inert gas, i.e., flue gas produced in inert gas generator 49 by burning natural gas supplied through line 50, is fed into solids reslurrying drum 35 through line 36, and passes through line 31, through first stage centrifuge 30, and ultimately through line 32, knock out condenser 53, line 58, and low pressure vent gas adsorber 59, to maintain a slight positive pressure on the system.

The slurry of terephthalic acid in acetic acid is maintained in drum 35 for several minutes at about 150–300° F., e.g., 200° F., with continuous agitation and thereafter is withdrawn from solids reslurrying drum 35 and sent to centrifuge 39 via line 38. In centrifuge 39, wet terephthalic acid crystals are separated from magna, and the mother liquor is sent via line 43 and surge tank 44, back to the reactor via line 4. This mother liquor contains most of the impurities originally present in the crude terephthalic acid. While still in centrifuge 39, the terephthalic acid crystals are washed with a fresh stream of 95% acetic acid comprising a minor amount of the acetic acid dehydrated in solvent dehydration column 66 and stored in surge drum 55; this wash acid is then separated from the crystals in centrifuge 39 and used as wash in first stage centrifuge 30 where it provides an initial purification for the crude terephthalic acid originally separated from the hot reaction mixture.

The washed crystals then leave centrifuge 39 through line 45 and pass into vibration drier 46 where inert gas from flue gas generator 49 is supplied through line 47 contacts the crystals in a countercurrent direction and evaporates the adhering acetic acid. Inert gas and acetic acid vapors leave vibration drier through line 48 where they join a similar stream from first stage centrifuge 30 and from second stage centrifuge 39 (through line 51) for acetic acid recovery.

The dry terephthalic acid which leaves vibration drier 46 as a crystal powder stream is remarkably pure and is virtually free from any impurities. It can generally be used in applications requiring high degrees of terephthalic acid purity; where exceptional purity standards are imposed, additional treatment may be employed. The terephthalic acid obtained from the present system is obtained at a rate of 1300 pounds per hour, which is a yield of 130 weight percent of paraxylene fed to the system.

Returning to first stage centrifuge 30, the acetic acid wash liquor and reactor effluent liquid centrifuged from the terephthalic acid crystals is sent through line 34 to solvent flash distillation column 63, operating at a pressure of between about atmospheric and about 75 pounds per square inch gage pressure, e.g., 25 p.s.i.g., and at a reboiler temperature of 350° F. for 25 p.s.i.g. operation. In column 63, a stream containing substantially all of the water and acetic acid is distilled overhead, and after being condensed in overhead condenser 64 is split into a reflux stream and an overhead stream comprising dilute aqueous acetic acid at a rate of 1982 lbs./hour of acetic acid and 402 pounds per hour of water, the acetic acid being herein expressed as 95% acetic acid and 5% water. A simplified embodiment of solvent flash distillation column 63 includes the elimination of condenser 64 and the direct transfer of vapors from column 63 to solvent dehydration column 66; this eliminates one condenser and receiver and reduces the load on the reboiler of column 66. The bottoms from solvent flash distillation column 63 comprises heavy metal oxidation catalyst, bromine promoter, oxidation intermediates and by-products, and a trace of terephthalic acid.

The overhead distillate from column 63 comprising water and acetic acid is pased through line 65 to solvent dehydration column 66, operating at about 8–30 pounds per square inch absolute pressure desirably about 16–20 p.s.i.a. Here water is distilled overhead while the dehydrated 95% acetic acid is obtained through line 67 as a bottoms product. The overhead distillate from column 66 is condensed in condenser 68 and the net reflux sent through line 69 to slop facilities. Solvent dehydration column 66 may optionally contain any one of the known acetic acid-water azeotroping agents such as methyl isobutyl ketone for improved fractionation efficiency.

Returning momentarily to solvent flash distillation column 63, the normally-solid distillation bottoms from this column comprising catalyst, bromine promoter, acidic reaction by-products and intermediates, and any unrecovered terephthalic acid is withdrawn through line 66 and sent to kettle 88. Kettle 88 is provided with a scrapper-type agitator to prevent the accumulation of solids on the kettle walls; the kettle itself is heated by a means of a steam jacket and operates under vacuum. A stream of concentrated caustic or other aqueous solution of a monvalent alkali hydroxide is introduced through line 86 for the purpose of dissolving intermediates, by-products and terephthalic acid, leaving the heavy metal oxidation catalyst in the form of an insoluble residue, presumably either hydroxide or terephthalate salts of the catalyst. Kettle 88 is maintained under vacuum with the vapors passing through line 71, vacuum pump exhaust condenser 72, and low pressure vent gas absorber 59 via a line, not shown. Liquid condensed by condenser 72 is sent via line 74 back to solvent flash distillation column 63.

The oxidation catalyst suspended in caustic is transferred from kettle 88 via line 75 to plate-and-frame filter press 76 where the catalyst is separated and recovered as a re-usable filter cake. This cake is returned to preparation tank 5 where it is dispersed in acetic acid for ultimate return to oxidation reactor 1. It is manifest that heavy metal oxidation catalysts employed in the oxidation of any aromatic compound to produce aromatic carboxylic acids may be separated from their admixture with acidic reaction by-products by means of extraction with aqueous solutions of monovalent alkali hydroxides.

The mother liquor from filter press 76 is transferred to by-product acid springing tank 79, where 40° Baumé nitric acid is introduced to convert acidic reaction by-products to the water-insoluble organic acid forms. These organic acids, comprising terephthalic acid plus intermediates and by-products are recovered from by-product filter press 82 via line 83, while the mother liquor passes through line 84 to slop.

From the foregoing description it is manifest that the present invention provides an exceedingly valuable commercial system for producing high purity terephthalic acid from substantially pure paraxylene. The combination of high-efficiency catalytic air oxidation, terephthalic acid purification, and integrated acetic acid recovery and recycle, renders the heretofore difficult preparation of high purity terephthalic acid both convenient and economical. Furthermore, the recovery and recycle of heavy metal oxidation catalysts by aqueous caustic extraction of acidic reaction byproducts permits the process to be conducted with only minimal catalyst makeup requirements.

The temperatures, pressures, contact times, and other conditions set forth in the specific example herein described will, of course, be dependent to a considerable extent on the particular process conditions utilized throughout the plant. Hence the conditions are to be considered operable for the specific example described, although not necessarily optimum for all operations and for other monocarboxylic acids such as propionic, etc.

This application is a division of my copending application S.N. 808,150, filed April 22, 1959, now abandoned.

Having described the preferred form of the present invention, what is claimed is:

1. Apparatus for making purified terephthalic acid through oxidizing a feedstock consisting essentially of paraxylene with molecular oxygen in the presence of dehydrated saturated monocarboxylic acid having from two to eight carbon atoms, inclusive, in the molecule, heavy metal oxidation catalyst, and a bromine-affording substance all of which comprise mixture for reaction; which comprises: an oxidation vessel fabricated from corrosion resistant metal having means for receiving mixture for reaction, removing liquid reaction mixture containing terephthalic acid solids, and means for removing vapors and gases therefrom; a condenser; transfer means for conducting said vapors and gases to said condenser; transfer means for returning condensate to said oxidation vessel; solid-liquid phase separation means for separating crude terephthalic acid crystals from the liquid portion of the reaction mixture; distillation means for separating said liquid portion into a water overhead fraction, a dehydrated saturated monocarboxylic acid fraction, and a distillation bottoms fraction containing catalyst and acidic reaction byproducts and intermediates; means for washing the crude terephthalic acid crystals with dehydrated saturated monocarboxylic acid, connections for supplying said dehydrated acid to said means for washing the crude terephthalic acid crystals, and connections for cycling the dehydrated acid after washing to the oxidation vessel; and means for drying the washed terephthalic acid crystals to recover a purified and dried terephthalic acid product.

2. Apparatus of claim 1 wherein said means for washing the crude terephthalic acid crystals include at least two centrifuges, with connections for supplying to the first centrifuge a portion of the second centrifuge wash liquid, connections for supplying the second contrifuge with dehydrated saturated monocarboxylic acid in two portions, and connections for conducting one portion to the oxidation vessel and for conducting the other portion to the first centrifuge.

3. Apparatus of claim 2 including a reslurrying vessel between said two centrifuges wherein the initially washed terephthalic acid crystals are slurried with the other portion of dehydrated saturated monocarboxylic acid.

References Cited in the file of this patent
UNITED STATES PATENTS

| | | |
|---|---|---|
| 2,545,144 | Green et al. | Mar. 13, 1951 |
| 2,962,361 | Spiller et al. | Nov. 29, 1960 |